United States Patent [19]

Wieserman et al.

[11] Patent Number: 4,994,429
[45] Date of Patent: * Feb. 19, 1991

[54] ACTIVE MATERIAL USEFUL AS ADSORBENT COMPRISING METAL OXIDE/HYDROXIDE PARTICLES REACTED WITH PHOSPHORUS-CONTAINING ORGANIC ACID GROUP OF ORGANIC COMPOUND HAVING UNREACTED ACID GROUP

[75] Inventors: Larry F. Wieserman; Karl Wefers, both of Apollo; Kathryn Cross, Murrysville; Edward S. Martin, New Kensington, all of Pa.

[73] Assignee: Aluminum Company of America, Pittsburgh, Pa.

[ * ] Notice: The portion of the term of this patent subsequent to Nov. 29, 2005 has been disclaimed.

[21] Appl. No.: 265,242

[22] Filed: Oct. 31, 1988

Related U.S. Application Data

[63] Continuation-in-part of Ser. No. 23,423, Mar. 9, 1987, Pat. No. 4,788,176, which is a continuation-in-part of Ser. No. 946,870, Dec. 29, 1986, abandoned.

[51] Int. Cl.$^5$ .................. B01J 20/22; B01J 20/06; B01D 15/08; B32B 9/00
[52] U.S. Cl. .................. 502/401; 55/67; 210/198.2; 210/502.1; 210/635; 210/656; 210/659; 427/220; 435/176; 502/7; 502/162; 502/407; 502/415
[58] Field of Search .............. 502/401, 407, 415, 162, 502/4; 427/244, 402, 220; 55/67, 186; 210/656-659, 198.2, 198.3

[56] References Cited

U.S. PATENT DOCUMENTS

| | | | |
|---|---|---|---|
| 3,013,904 | 12/1961 | Cupery | 117/76 |
| 4,202,798 | 5/1980 | Johnson et al. | 252/437 |
| 4,308,079 | 12/1981 | Venables et al. | 148/6.15 R |
| 4,382,016 | 5/1983 | Rickelton et al. | 252/428 |
| 4,506,628 | 3/1985 | Stockel | 119/1 |
| 4,786,628 | 11/1988 | Wieserman et al. | 502/401 |
| 4,788,176 | 11/1988 | Wieserman et al. | 502/401 |
| 4,816,159 | 3/1989 | Khosah | 210/659 |
| 4,871,711 | 10/1989 | Martin et al. | 502/401 |
| 4,880,543 | 11/1989 | Khosah et al. | 210/659 |

*Primary Examiner*—Paul E. Konopka
*Attorney, Agent, or Firm*—Andrew Alexander

[57] ABSTRACT

An active material is disclosed which comprises a metal oxide/hydroxide surface having chemically bonded to reactive sites thereon a substantially monomolecular layer of organic acid molecules. Each organic acid molecule is chemically bonded to a reactive site on the oxide/hydroxide surface through a phosphorus-containing acid group selected from the group consisting of a phosphonic acid group and a phosphinic acid group. Each organic acid molecule also comprises an unreacted acid group oriented away from the metal oxide/hydroxide surface and selected from the class consisting of a phosphonic acid group, a phosphinic acid group, a sulfonic acid group, and a carboxylic acid group.

20 Claims, 1 Drawing Sheet

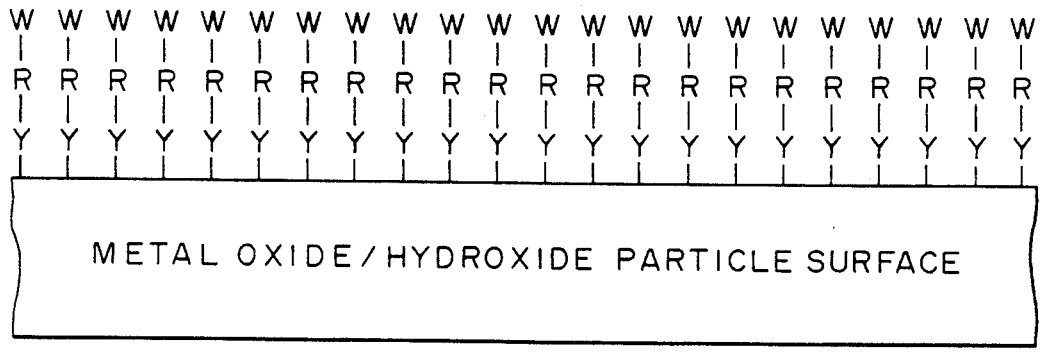

```
┌─────────────────────────────────────────────────────┐
│  PROVIDING AN ACID MOLECULE HAVING A PHOSPHORUS-    │
│   CONTAINING ACID GROUP ON ONE END OF THE MOLECULE  │
│   AND (OPTIONALLY) ANOTHER ACID GROUP SELECTED FROM │
│    THE CLASS CONSISTING OF PHOSPHONIC, PHOSPHINIC,  │
│   SULFONIC, AND CARBOXYLIC ACIDS ON OR ADJACENT THE │
│              OTHER END OF THE MOLECULE              │
└─────────────────────────────────────────────────────┘
                           ↓
┌─────────────────────────────────────────────────────┐
│    REACTING THE ACID MOLECULE WITH REACTIVE SITES ON│
│  THE SURFACE OF A METAL OXIDE/HYDROXIDE PARTICLE TO │
│     FORM A MONOMOLECULAR LAYER OF ACID MOLECULES    │
│       BONDED TO THE METAL OXIDE/HYDROXIDE SURFACE   │
└─────────────────────────────────────────────────────┘
                           ↓
┌─────────────────────────────────────────────────────┐
│  OPTIONALLY FORMING ON OR ADJACENT THE FREE END OF  │
│   THE ACID MOLECULE AN UNREACTED ACID GROUP SELECTED│
│          FROM THE CLASS CONSISTING OF PHOSPHONIC,   │
│     PHOSPHINIC, SULFONIC, AND CARBOXYLIC ACIDS IF THE│
│        UNREACTED ACID GROUP IS NOT ALREADY PRESENT  │
└─────────────────────────────────────────────────────┘
                           ↓
┌─────────────────────────────────────────────────────┐
│    RECOVERING AN ACTIVE MATERIAL COMPRISING A METAL │
│   OXIDE/HYDROXIDE PARTICLE HAVING A MONOMOLECULAR   │
│     LAYER OF ACID MOLECULES BONDED TO REACTIVE SITES│
│      ON THE SURFACE, EACH ACID MOLECULE HAVING A    │
│         PHOSPHORUS-CONTAINING ACID GROUP BONDED TO THE│
│   METAL OXIDE/HYDROXIDE SURFACE AND AN UNREACTED    │
│      ACID GROUP ORIENTED AWAY FROM THE SURFACE      │
└─────────────────────────────────────────────────────┘
```

FIG. 1

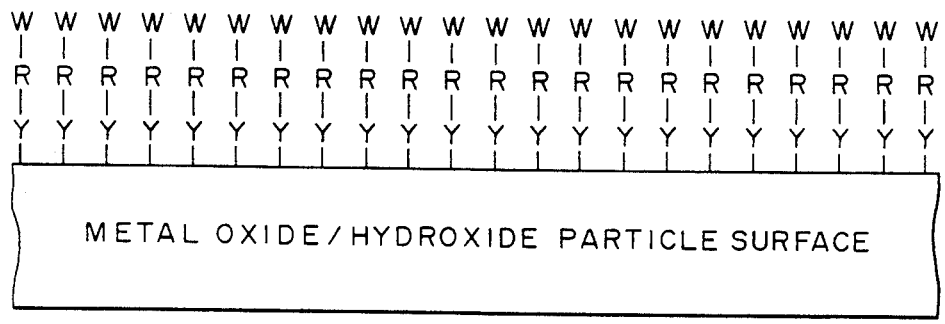

FIG. 2

ACTIVE MATERIAL USEFUL AS ADSORBENT COMPRISING METAL OXIDE/HYDROXIDE PARTICLES REACTED WITH PHOSPHORUS-CONTAINING ORGANIC ACID GROUP OF ORGANIC COMPOUND HAVING UNREACTED ACID GROUP

CROSS REFERENCE TO RELATED APPLICATIONS

This application is a continuation-in-part of U.S. Ser. No. 023,423, filed Mar. 9, 1987, now U.S. Pat. No. 4,788,176 which is a continuation-in-part of U.S. Ser. No. 946,870, filed Dec. 29, 1986 (now abandoned), and is related to U.S. Ser. No. 023,312, filed Mar. 9, 1987, now U.S. Pat. No. 4,871,711 and U.S. Ser. No. 023,429, filed Mar. 9, 1987, now U.S. Pat. No. 4,786,628.

BACKGROUND OF THE INVENTION

1. Field of the Invention

This invention relates to the product of the reaction of reactive sites on metal oxide/hydroxide particles with a phosphorus-containing acid group of one or more organic acid compounds which also have an unreacted acid group in the molecule. More particularly, this invention relates to the product of reactive sites on metal oxide/hydroxide particles with a phosphonic or phosphinic acid molecule which also contains an unreacted acid group, usually at the opposite end of the organic acid molecule.

2. Description of the Related Art

Analytical and industrial adsorbents made from organic resins suffer from poor physical strength, poor thermal stability, high cost, solvent swelling, and low capacity. Adsorbents made from metal oxides such as silica exhibit poor chemical stability at high pH. For many applications, in particular for high pressure and large separation columns, an adsorbent with high physical integrity, good chemical stability over high and low pH conditions, specific surface functionalities, good thermal stability, and low cost is needed for a wide range of applications.

Other metal oxides such as alumina have also been used as adsorbents because of the good physical integrity and low cost of alumina. The solubility of alumina in pH ranges between 4 and 9 is very low and the material is, therefore, chemically and physically stable in this pH range. However, beyond this pH range, on either the basic or acidic side, alumina becomes soluble in aqueous media and its physical strength and integrity degrades rapidly.

Modifications of metal oxide adsorbents such as alumina and aluminosilicates have been proposed. Stockel U.S. Pat. No. 4,506,628 teaches the formation of an adsorbent animal litter utilizing alumina, aluminosilicates, or coal residues as the substrate intimately mixed with monomers containing acid functionalities which polymerize in situ. The monomer, such as vinyl phosphonic acid, together with a redox catalyst, is mixed with a pliable dough formed from alumina and water and extruded into pellets which harden as the monomer polymerizes.

Modified alumina has also been used in the formation of catalysts. Johnson et al U.S. Patents 4,202,798 and 4,251,350 describe the formation of a hydrocarbon hydrotreating catalyst formed by contacting alumina with a phosphorous-containing acid compound such as phenylphosphonic acid and then calcining the phosphorus-containing hydrous alumina. The calcined alumina is then treated with at least one metal-containing compound and again calcined to form the catalyst product.

In addition, Cupery U.S. Pat. No. 3,013,904 discloses a substrate having an organic polymer containing pentavalent phosphorus bonded thereto. Coatings of phosphorus-containing organic polymers are applied over coatings of positively charged colloidal metal oxides applied to negatively charged substrates. The thickness of the combined colloidal oxide and polymer layers on a substrate is less than 100 millimicrons.

Venables et al U.S. Pat. No. 4,308,079 teaches the treatment of an aluminum oxide surface of a aluminum substrate with a monomolecular layer of an amino phosphonate compound such as nitrilotris (methylene) triphosphonic acid to retard hydration of the aluminum oxide to aluminum hydroxide to provide a more stable microporous surface which is particularly suited to commercial adhesives. The presence of the hydrated oxide is said to interfere with the formation of a satisfactory bond between the adhesive and the oxide, while the phosphonate treatment is said to inhibit the conversion of the oxide to hydroxide without interfering with subsequent bonding of the adhesive to the oxide.

SUMMARY OF THE INVENTION

An active material is provided comprising a metal oxide/hydroxide particle having chemically bonded to reactive sites on the surface thereof a substantially monomolecular layer of organic acid molecules, each organic molecule comprising an unreacted acid group and a phosphorus-containing acid group chemically bonded to a reactive site on the metal oxide/hydroxide particle.

It is, therefore, an object of this invention to provide an active material suitable for use as an adsorbent comprising a substantially monomolecular layer of organic acid molecules bonded to the surface of a metal oxide/hydroxide particle.

It is another object of this invention to provide an active material suitable for use as an adsorbent stable at extended pH ranges and insoluble in aqueous media ranges comprising a substantially monomolecular layer of one or more phosphorus-containing organic acid molecules chemically bonded to the surface of a metal oxide/hydroxide particle.

It is yet another object of this invention to provide an active material suitable for use as an adsorbent stable at extended pH ranges of from 1 to 14 and insoluble in aqueous media ranges comprising a substantially monomolecular layer of one or more phosphorus-containing organic acid molecules chemically bonded to the surface of a metal oxide/hydroxide particle wherein each of the phosphorus-containing organic acid molecules is further comprised of an unreacted acid group oriented away from the surface of the metal oxide/hydroxide particle and capable of functioning as the active component of the molecule.

It is a further object of this invention to provide an active material suitable for use as an adsorbent comprising a substantially monomolecular layer of one or more phosphorus-containing organic acid molecules chemically bonded to the surface of a metal oxide/hydroxide particle, each of said organic acid molecules further comprising a phosphorus-containing acid group chemically bonded to the metal oxide/hydroxide surface and an unreacted acid group oriented away from the surface of the metal oxide/hydroxide particle and capable of functioning as the active component of the molecule.

It is yet a further object of this invention to provide a process for making such an active material suitable for use as an adsorbent comprising a substantially monomolecular layer of one or more phosphorus-containing organic acid molecules chemically bonded to the surface of a metal oxide/hydroxide particle, each of said organic acid molecules further comprising a phosphorus-containing acid group chemically bonded to the metal oxide/hydroxide surface, an unreacted acid group oriented away from the surface of the metal oxide/hydroxide particle and capable of functioning as the active component of the molecule, and an —R— group linking the phosphorus-containing acid group and the unreacted acid group, where R contains a 1–30 carbon atoms comprising an aliphatic, aromatic, carbocyclic, or heterocyclic moiety.

It is still a further object of this invention to provide a process for making such an active material suitable for use as an adsorbent comprising a substantially monomolecular layer of one or more phosphorus-containing organic acid molecules chemically bonded to the surface of a metal oxide/hydroxide particle, each of said organic acid molecules further comprising a phosphorus-containing acid group chemically bonded to the metal oxide/hydroxide surface; an unreacted acid group oriented away from the surface of the metal oxide/hydroxide particle and capable of functioning as the active component of the molecule selected from the group consisting of phosphonic acid, phosphinic acid, sulfonic acid, and carboxylic acid; and an —R— group linking the phosphorus-containing acid group and the unreacted acid group, where R contains 1–30 carbon atoms comprising an aliphatic, aromatic, carbocyclic, or heterocyclic moiety.

These and other objects of this invention will be obvious from the following description and accompanying drawings.

BRIEF DESCRIPTION OF THE DRAWINGS

FIG. 1 is a flowsheet illustrating the invention.

FIG. 2 is an illustration showing the bonding of the phosphorus-containing acid group of each acid molecule to the metal oxide/hydroxide surface to form a monomolecular layer an unreacted acid group on each acid molecule oriented away from the metal oxide/hydroxide surface.

DETAILED DESCRIPTION OF THE INVENTION

In accordance with the invention, the active material comprises a metal oxide/hydroxide particle having chemically bonded to reactive sites on the surface thereof a substantially monomolecular layer of organic acid molecules, each organic molecule comprising a phosphorus-containing acid group chemically bonded to a reactive site on the metal oxide/hydroxide particle and an unreacted acid group oriented away from the surface of the metal oxide/hydroxide particle and capable of functioning as the active component of the molecule. This active material is suitable for use as an adsorbent which is stable over a large pH range, i.e., from 1–14, and which, unlike at least some of the metal oxide/hydroxides useful as the support material, is insoluble in aqueous media.

The active material also may be useful for: an analytical and prepative-scale chromatographic support; an ion exchange media; a coupling agent for biological materials such as enzymes, whole cells, yeasts, proteins, microbes, pharmaceuticals including timed-release drugs, and vaccines; stabilization of inorganic membranes used at high and low pH; coatings for piezoelectric crystals; spacer molecules for holding metal oxide particles apart; coatings for fillers and flame-retardants in polymers; coatings for inhibiting cation or anion adsorption (such as F-adsorption on alumina); formation of hydrophobic surfaces on metal oxides to control wetting and dispersion properties in fluid media; controlling surface charge in fluid media; promoters for adhesive bonding, ceramics, and polymers; coupling agents for immobilizing optically active molecules (chirality) for selective adsorption of optically active compounds (d or l isomers); surface modification for passivating surfaces of biological implants (e.g., bones, joints, teeth); additives to medicinal products (extenders, coloring agents, flavorings for toothpaste, creams); improve bonding between electrical insulation and a metal conductor (decrease lamination from weathering); controlling the abrasive properties of metal oxides powders; complexing agents for catalytically active metals for improved metal dispersion; producing stain and wear resistant coatings for plastic, concrete, or soft metal wear surfaces; selective adsorbing of toxic liquids or gases without adsorbing water; coupling agent for coloring polymers and paints; preservative coatings for natural products such as wood, straw, and stone to increase surface hardness, stain resistance, and color fastness; coating to increase the efficiency of photon radiation by enhanced absorption and/or light scattering; coating with bacteriostatic properties for pharmaceutical products, treating fabrics, and wood (e.g., treating wood shingles to inhibit formation of mold, mildew, and rot); flocculating agents for colloidal dispersions; metal chelating agents; and an additive to polish and waxes as extender and anti-wetting agent.

Other classes of compounds that may be immobilized on the active material surfaces using this technology include: enzymes, sugars, monoclonal antibodies, protein groups such as protein A (staphytococcal A), pharmaceutical compounds, yeasts, microbes, whole cells, dye molecules, chelated metal groups, tag molecules and combinations of these groups.

The use of the term "active material" is intended to define an organic molecule comprising a monomer, oligomer or short chain polymer having a phosphorus-containing acid group, preferably at the end of the molecule, which is bonded to the surface of an metal oxide/hydroxide particle, and also having thereon, preferably at the opposite end of the molecule, an unreacted acid group oriented away from the surface of the metal oxide/hydroxide particle and capable of functioning as the active component of the molecule which may be used for the coupling, bonding, or adsorbing, etc. of atoms, ions or other molecules thereto, e.g., when the active material functions as an adsorbent, the active material will have sites available on the molecule to which the material to be adsorbed will be attracted.

It should be noted that the organic acid molecules described herein may be used in combination with other molecules which do not have a free acid group, such as some of the materials described in our parent application Ser. No. 023,423.

The use of the term "metal oxide/hydroxides" herein is intended to define a broad spectrum of oxides ranging from those which may contain few hydroxides, e.g., activated forms of aluminum oxide (alumina) to more hydrated forms which may comprise mainly hydroxide, e.g., Al(OH)$_3$. It has been found, however, that the metal hydroxide form, rather than the metal oxide form, provides a better bond with the phosphorus-containing acid group on the organic molecule with which it is reacted. However, for certain applications, dehydrated or activated forms of the metal oxide/hydroxide may be preferred due to the higher surface area of such particles. For example, when aluminum oxide/hydroxide is used, the hydrated form will be preferred, e.g., gibbsite, bayerite, or boehmite will be preferred when a large external surface area is desired and activated alumina will be preferred when it is desirous that the metal oxide/hydroxide have a high internal surface area.

As presently understood, the metal oxide/hydroxides suitable for use in the present invention usually require hydroxyl groups on the surface thereof for purposes of providing bonding sites for the phosphorus-containing organic acid materials. For example, when the particulate material is alumina, hydroxyl groups on the surface of the alumina react with the phosphorus-containing acid group of the organic molecule, i.e., with the —POOH acid group of the phosphonic or phosphinic acid. When using an organic solvent, particularly where the solvent is immiscible with water, a monolayer of hydroxyl groups are provided on the alumina particles for purposes of reacting to form a chemical bond with the phosphonic or phosphinic acid groups. It will be appreciated that if more than a monolayer of hydroxyl units are present on the alumina surface, such as hydroxyl units present as a result of water, this additional water layer can act to hinder the reaction. Thus, while it is preferred to have a maximum of a monolayer of hydroxyl units, less than a complete surface layer of hydroxyl units can be present on the metal oxide and such does not hinder reactivity.

Metal oxide/hydroxides which may be used as the support particle for reaction with the phosphorus-containing organic acid material include any metal capable of forming an oxide/hydroxide selected from the group consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), elements in the lanthanide series and the actinide series, mixtures thereof, and mixtures of Groups IIa (Be, Mg, Ca, Sr, Ba, and Ra) and VIb (Se, Te, and Po).

For example, the oxide/hydroxides of aluminum, magnesium, titanium, zirconium, iron, silicon, chromium, zinc, vanadium, and combinations of these may be used. Also, a core or center of iron oxide/hydroxide or other paramagnetic or ferromagnetic material may be used with a coating of a metal compound to take advantage of the magnetic properties of the iron oxide/hydroxide as an adsorbent. It should be noted that by use of the term "metal", it is intended to include not only the traditional metals, but also materials sometimes referred to as metalloids such as Se, B, As, and Te and to exclude the remaining elements referred to as nonmetals in the periodic table.

While the invention is primarily directed to the use of metal oxide/hydroxide particles as support materials for reaction with the phosphorus-containing organic acid molecules to form the active material, it is within the purview of this invention that other metal compounds could be used in substitution for the metal oxide/hydroxides such as metal silicates, oxalates, phosphates, sulfates, carbonates, apatites, hydrotalcites, zeolites, kaolin, clays and chromates as well as combinations of such materials or combinations of any of such materials with the preferred metal oxide/hydroxide support materials. Also metal oxide/hydroxides such as aluminum oxide/hydroxides with surfaces ion-exchanged or adsorbed with titanium, iron, or zirconium ions or oxides may be used.

With respect to the metal oxide/hydroxides used in the present invention, it is preferred that they are provided in particulate form for certain applications. When the use is adsorbents, particle sizes can range from as low as 50 Å to provide large external surfaces and up to 12 millimeter for large reactors. When the adsorbent base is alumina the particle size can be 1 to 200 microns. It will be appreciated that other uses, for example, flocculation, flame retardant in polymers, heterogeneous catalyst, can require different particle sizes. However, normally for adsorbent use, the particle size is greater than 1 micron. Typical particle size distributions, when the metal oxide/hydroxide particles comprises aluminum oxide/hydroxide (alumina), are 1, 3–6, 7–12, 10–18, 18–32, 32–63, and 50–200 microns.

With respect to purity, the level of impurity should be minimized depending on the end use. However, for adsorbents, for example, the metal oxide or metal compound should have a purity level of over 80%, preferably 95% or greater. Surface area of the particle is preferred to be high with typical surface areas for alumina, for example, being in the range of 0.10 to 600 m$^2$/g and up to 1000 m$^2$/g for other metal oxide/hydroxides.

The formula for the organic acid material having a reacted phosphorus-containing acid group and an unreacted acid group useful in the practice of the invention may be written as W-R-Y where W is the unreacted acid group selected from the class consisting of a sulfonic acid group having the formula —SO$_3$H, a carboxylic acid having the formula —COOH, a phosphonic acid having the formula —PO(OH)$_2$, and a phosphinic acid having the formula —R'PO(OH) where R' may be hydrogen or a 1–30 carbon-containing radical; R is an organic radical selected from the class consisting of saturated and unsaturated hydrocarbons having the formula —C$_m$H$_n$— where m is an integer from 1—30 and n is an integer from 2 to 60, aromatic radicals having the formula

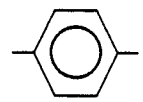

carbocylic radicals having the formula

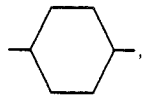

and heterocyclic radicals; and Y is selected from the phosphorus-containing organic acids: phosphonic acid having the formula —PO(OH)$_2$ and phosphinic acid having the formula —R'PO(OH) where R'may be hydrogen or a 1-30 carbon-containing radical.

Examples of the carbon-containing radicals which may comprise R' include long and short chain aliphatic saturated and unsaturated hydrocarbon radicals including alkyls, alkenyls, and alkynyls; aromatic hydrocarbon radicals such as benzyl and phenyl, heterocyclic radicals such as pyridine and piperidine radicals; and carbocyclic radicals such as cyclohexyl; as well as carboxylic acids, aldehydes, ketones, amines, amides, thioamides, imides, lactams, anilines, anhydrides, carbohydrates and thiocyanates, esters, lactones, ethers, alcohols, nitriles, oximes, organosilicones, sulfur containing organic compounds, ureas, thioureas, perfluoro organic radicals, perchloro organic radicals, perbromo organic radicals, and combinations of these groups.

To produce the active material comprising the metal oxide/hydroxide reacted with one or more types of phosphorus-containing organic acid molecules having the above W-R-Y formula, the metal oxide/hydroxide, such as alumina, may be reacted with a substituted phosphonic or phosphinic acid of the formula W-R-Y, as described above, in a suitable media including an aqueous or nonaqueous solution, emulsion, or suspension, at a temperature of from just above the freezing point up to the boiling point of the solution, preferably from about 5° C. up to about 90° C. in an aqueous media, typically about 50° C., for a period of from at least about 1 second to not more than 20 hours, and preferably from at least about 0.5 hours up to about 4 hours. When the media is non-aqueous, the temperature range can be greatly extended. For example, it may range from 5° C. or lower to 200° C. or sometimes higher depending on the solvent. The reaction is normally carried out at atmospheric pressure. However, the use of an elevated pressure or a subatmospheric pressure should be deemed to be within the scope of the invention. A flowing bed reactor or an aerosol may also be utilized in the treatment of the metal oxide/hydroxide particles with the phosphorus-containing material.

The initial acid concentration may vary from at least about 0.0001 up to 0.1 molar. In some instances higher concentrations may be desired. However, to achieve the desired orientation of the organic acid molecules with the phosphorus-containing acid group, i.e., the —Y group, at one end of the molecule bonded to the surface and the other acid group on the molecule, i.e., the —W group, not bonded to the metal oxide/hydroxide surface, as Shown in FIG. 2, it is important that the concentration of the acid be sufficient to provide reaction between the metal oxide/hydroxide surface and only one acid group on each acid molecule. That is, if one is to provide a modified surface with free acid groups thereon in accordance with the invention, it is important that both acid groups on each organic acid molecule do not react with the metal oxide/hydroxide surface. In general, it has been found, for example, with alumina, that if the amount of acid present, as a function of particle surface area, is maintained at about 4–6 micromoles/square meter, preferably about 4.5–5.5 micromoles/square meter, and most preferably about 5 micromoles/square meter, that a monomolecular layer will be formed on the particle surface with one acid group per molecule generally bonded to the particle surface. Generally, an acid concentration of from about 0.1 to 10 micromoles/square meter, preferably about 2 to 6 micromoles/meter, is used. Higher concentrations may be used, but will necessitate further washing, as will be described below.

While the carboxylic or sulfonic acid groups, if present, may initially bond to the metal oxide/hydroxide surface, the thermodynamics of the reaction will favor the bonding of the phosphorus-containing acid group to the metal oxide/hydroxide surface if the reaction is allowed to proceed long enough and if the concentration of the organic acid molecules is sufficient.

In the case of alumina, the order of stability for adsorbed acids in aqueous media is phosphonates > carboxylates > sulfates. Consequently, when a molecule contains dissimilar acid groups, e.g., 3-phosphonopropanoic acid having the formula $(HO)_2P(O)—CH_2CH_2—COOH$, the molecular orientation relative to the surface of the particles is with the least stable acid group, e.g., the carboxylic acid group, away from the particle's surface and the most stable acid group, e.g., the phosphonic acid group, bonded to the particle's surface.

In the case of the phosphonic acid group comprising the unreacted end of the molecule (W—), such groups may be formed from the reacting of an original group at the end of the molecule, X. For the case of the organic group being an alkyl group, X is iodine, bromine, or chlorine (in order of decreasing reactivity). The groups are reacted with a tri-alkyl phosphite ester, $(R'O)_3P$ (R is either methyl, ethyl, n-propyl or n-butyl; methyl is preferable in most cases) at 150° C. in a hydrocarbon solvent for 0.5 to 360 minutes to form the phosphonic acid ester. The phosphonic acid ester is then hydrolyzed by either acid or base catalysis to obtain the phosphonic acid or phosphonate sale, respectively.

The phosphinic acid group is formed by using the procedure described for the phosphonic acid preparation, but using a phosphonic acid ester $R'P(OR'')_2$ in place of the phosphite ester.

An acid phosphate group at the free end of the molecule may be prepared by reacting an organophosphonic acid containing an alcohol group with the metal oxide surface. The alcohol group is then reacted with phosphorus oxychloride ($POCl_3$) and a tertiary amine (example: pyridine or triethylamine) in a hydrocarbon solvent at 0° to 20° C. for 0.5 to 120 minutes. One mole of phosphorus oxychloride and one mole of tertiary amine are used per mole of alcohol groups on the metal oxide surface. The intermediate product is a halophosphate. After the solids are separated from the reaction slurry, the halophosphate is converted to the acid phosphate by reaction with a large excess of cold water.

Alternatively, the active material of the invention may be produced by first reacting the metal oxide/hydroxide surface with an unsubstituted phosphonic acid or phosphinic acid molecule, i.e., an organic acid molecule not containing the W— unreacted acid group, and then reacting the active material with an acid producing reagent to form the W— acid group on or adjacent the end of the phosphorus-containing acid molecule not chemically bonded to the metal oxide/hydroxide surface. In this manner chemical bonding of the phosphorus-containing acid group of the organic acid molecule to the metal oxide/hydroxide surface can be assured. This may be particularly advantageous when the W— group is a sulfonic or carboxylic acid group to ensure that all of the unreacted acid groups are the desired sulfonic acid groups or carboxylic acid groups as the case may be, rather than phosphonic or phosphinic acid groups.

In the case of phosphonic or phosphinic acid groups comprising the W— unreacted acid group of the molecule, such groups may be formed by reacting the organic molecule already bonded to the surface of the metal oxide/hydroxide respectively with phosphoric acid to form a phosphonic acid group or phosphonic acid to form a phosphinic acid group on the organic acid molecule already bonded to the metal oxide/hydroxide surface. The reaction may be carried out at a temperature of from just above the freezing point up to the boiling point of the solution, preferably from about 5 to about 95 °C. for an aqueous media, typically at room temperature (25° C.), for a period of from about 0.5 to about 120 minutes.

In the case of a sulfonic acid group, when forming the —W acid group by reaction after the organic acid molecule is chemically bonded to the metal oxide/hydroxide surface, the already bonded organic acid molecule may be reacted with sulfur trioxide ($SO_3$), concentrated sulfuric acid (95-98%), or fuming sulfuric acid at a temperature of from about 2 to about 70° C., typically at room temperature (25° C.), for a period of from about 1 to about 120 minutes.

When it is desired to form a carboxylic acid group on the organic acid molecule after bonding of the molecule to the metal oxide/hydroxide surface, this may be carried out by reacting the organic acid molecule with a compound capable of reacting with the organic acid molecule to provide a group on the molecule which is then subsequently capable of forming the desired carboxylic acid group on the free end of the organic acid molecule, i.e., on the portion of the organic acid molecule not already bonded to the metal oxide/hydroxide surface. Examples of such compounds which could be reacted with the organic acid molecule already bonded to the metal oxide/hydroxide surface are primary alcohols and alkyl benzenes which then may be subsequently oxidized at the proper pH to form the carboxylic group as follows:

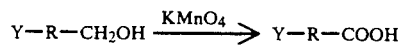

or

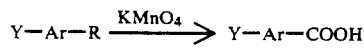

Other examples include Grignard reagents subsequently carbonated and nitriles which are then hydrolyzed as respectively shown below:

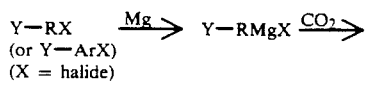

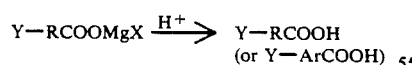

Grignard and Carbonation Reactions

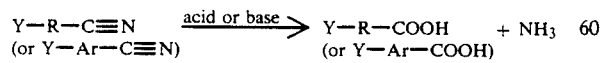

Nitrile Hydrolysis

In yet another embodiment, the organic acid compound having the formula W—R—Y, wherein W is a carboxylic acid, could be formed by first bonding to the metal oxide/hydroxide surface an organic acid molecule having a phosphorus-containing acid group thereon (—R—Y), but with another group already attached to the R group which may be subsequently reacted, e.g., oxidized, carbonated, hydrolyzed, etc., as discussed above, to form desired the carboxylic acid group after the step of chemically bonding the organic acid molecule to the metal oxide/hydroxide surface. Examples of such oxidizable groups which could be attached to the —R—Y molecule include alcohols, aldehydes, and ketones.

With respect to the bonding of the organic acid molecule to the metal oxide/hydroxide surface, while we do not wish to be bound by any particular theory of bonding, it is believed that when a metal oxide/hydroxide particle, for example, alumina, is brought into contact with the phosphonic or phosphinic acid group on the organic acid molecule, a reaction or adsorption of the acid on the alumina takes place in which the aluminum and phosphorous atoms in the respective molecules are apparently bonded together through an oxygen atom as illustrated in the formulas below using alumina as an example of the metal oxide/hydroxide surface:

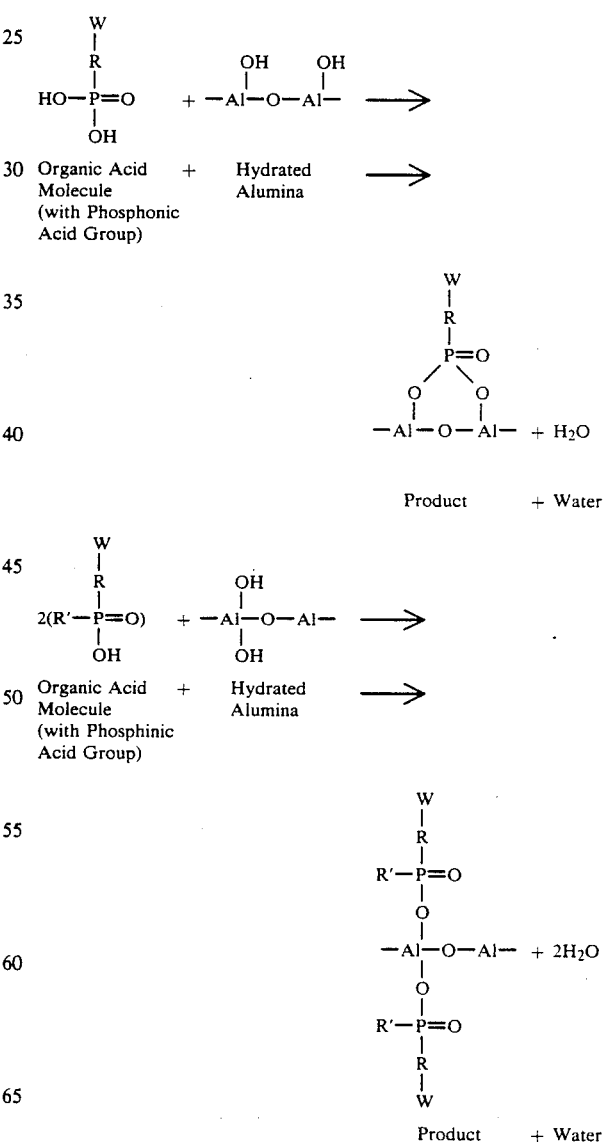

Note: Aluminum ions may be an octrahedrally or tetrahedrally

-continued coordinated cation with or without coordination vacancies at or near the surface (external or within pore structures).

Thus it can be seen, using the above proposed model, that if all of the exposed hydroxyl groups on the surface of the alumina can be reacted with the phosphonic or phosphinic acid groups of the organic acid molecules, the surface chemistry of the reacted alumina will be changed.

By "monolayer" or "monomolecular layer" is meant that 90%, and preferably 98%, of the organic acid moles each have a single phosphonic or phosphinic acid group thereon bonded to the metal oxide/hydroxide particle to form a single layer of molecules on the surface of the metal oxide/hydroxide surface, as shown in FIG. 2, with each acid molecule containing an unreacted acid group oriented away from the metal oxide/hydroxide surface.

In accordance with the invention, to ensure formation of only a monomolecular layer of the organic acid molecules on the surface of the metal oxide/hydroxide particle, the treated surface may be washed after the bonding reaction with any solvent which is capable of removing excess organic acid molecules which are bound to other organic acid molecules, i.e., are not chemically bound to the surfaces of the metal oxide/hydroxide particles, and which will not attack the organic acid molecules already chemically bonded to the metal oxide/hydroxide surfaces.

In a preferred embodiment, a sodium hydroxide solution, having a concentration ranging from about 0.001 to 1 molar and buffered with sufficient sodium bicarbonate to maintain the pH in a range of from about 9 to 12, may be used as the wash solution to remove the excess organic acid molecules, leaving only the desired bonded monomolecular layer. Other wash solutions which may be used instead of the sodium hydroxide include potassium hydroxide and ammonium hydroxide solutions which may also be buffered to provide approximately the same pH range.

For example, the wash solution may also comprise a weak acid such as a carboxylic acid, e.g., acetic or formic acid or a weak mineral acid (0.1–2N) such as sulfuric, nitric, or hydrochloric acid. The wash solution might also comprise an alcohol such as isopropanol or butanol. However, the use of bases as wash solutions are preferred since the resulting salts, e.g., sodium or potassium salts, are more soluble.

The thickness of the resulting phosphorus-containing bonded organic monomolecular layer is in the range of 3 to 5000 Å and preferably 5 to 500 Å.

The following examples will serve to further illustrate the invention.

EXAMPLE I

Material consisting of 50 grams of 8-10 micrometer particulate alumina (alcoa CGA) was added to 200 milliliters of 0.1 molar 3-phosphonopropanoic acid dissolved in 1-butanol. The mixture was heated to 60° C. and filtered after 2 hours. The solid was washed with 1-butanol to remove weakly bound reagents and filtered or decanted. The remaining solid material was dried at 60° C. under aspirator vacuum. An infrared spectrum of the material showed that most of the carboxyl groups were in the free acid form indicated by a strong absorption band at 1710 $cm^{-1}$.

EXAMPLE II

A mixture of 8-10 micrometer particulate alumina (Alcoa CGA) and 0.1 molar phenylphosphonic acid was formed having a ratio of 4 milliliters of acid per gram of alumina. The mixture was refluxed for 1 hour at 83° C., cooled to room temperature, and then decanted. The recovered product was placed into a vacuum oven at 110° C. overnite to dry.

The reacted alumina was then cooled to room temperature and 10 grams was placed into a 125 ml flask to which was then added 20 mls of fuming sulfuric acid. The flask was capped and swirled to coat the particles and the flask was then shaken in a shaker bath for less than 2 minutes. The contents of the flask were then placed in 3 liters of deionized water and allowed to settle. The contents were rediluted 3 times with 3 liters of deionized water each time. The water was then decanted off and the contents were covered with methanol. The product was allowed to settle overnite and the methanol was then decanted off after which the product was then again covered with methanol which was allowed to evaporate off. The product was then dried in a vacuum oven overnite at 60° C. The resulting product contained free sulfonic acid groups on the free end of the phenyl phosphonic acid molecules with the phosphorus-containing acid group of the molecule bonded to the alumina surface.

EXAMPLE III

Material consisting of 50 grams of 8-10 micrometer particulate alumina (Alcoa CGA) was added to 200 milliliters of 0.05 molar phytic acid dissolved in water. The mixture was reacted at 25° C. and filtered after 2 hours. The solid residue was washed with water to remove weakly bound reagents and then filtered or decanted. The remaining solid material was dried under aspirator vacuum resulting in a product with free phosphorus-containing acid groups as well as phosphorus-containing acid groups bonded to the alumina surface.

Having thus described the invention, what is claimed is:

1. An active material comprising a metal oxide/hydroxide particle having a surface and having reactive sites thereon, said reactive sites having bonded thereto a substantially monomolecular layer of organic acid molecules, said organic acid molecules comprising unreacted acid groups and acid groups selected from phosphonic and phosphinic acid bonded to reactive sites on said metal oxide/hydroxide surface.

2. The active material of claim 1 wherein said organic acid molecules are comprised of unreacted acid groups oriented away from said metal oxide/hydroxide surface and capable of functioning as the active component of the molecule.

3. The active material of claim 1 wherein said organic acid molecules comprise acid groups selected from phosphonic and phosphinic acid chemically bonded to the metal oxide/hydroxide particle surface and an unreacted acid group oriented away from said metal oxide/hydroxide surface and capable of functioning as the active component of the molecule.

4. The active material of claim 1 wherein said organic acid molecules comprise acid groups selected from phosphonic and phosphinic acid chemically bonded to said metal oxide/hydroxide surface, an unreacted acid group oriented away from said metal oxide/hydroxide surface and capable of functioning as the active component of the molecule, and an —R— group linking said acid group and said unreacted acid group, where R contains not greater than 30 carbon atoms and comprises as aliphatic, aromatic, carbocyclic, or heterocyclic moiety.

5. The active material of claim 1 wherein said organic acid molecules comprise acid groups selected from phosphonic and phosphinic acid chemically bonded to said metal oxide/hydroxide surface; an unreacted acid group oriented away from said metal oxide/hydroxide surface and capable of functioning as the active component of the molecule selected from the group consisting of phosphonic acid, phosphinic acid, sulfonic acid, and carboxylic acid; and an —R— group linking said phosphorus-containing acid group and said unreacted acid group, where R contains not greater than 30 carbon atoms and comprises an aliphatic, aromatic, carbocyclic, or heterocyclic moiety.

6. The active material of claim 1 wherein said organic acid molecules comprise phosphorus-containing acid groups chemically bonded to said metal oxide/hydroxide surface selected from the group consisting of a phosphonic acid group and a phosphinic acid group; an unreacted acid group oriented away from said metal oxide/hydroxide surface and capable of functioning as the active component of the molecule selected from the group consisting of phosphorus-containing acid, sulfonic acid, and carboxylic acid; and an —R— group linking said phosphorus-containing acid group and said unreacted acid group, where R contains not greater than 30 carbon atoms and comprises an aliphatic, aromatic, carbocyclic, or heterocyclic moiety.

7. The active material of claim 1 wherein said organic acid molecules comprise phosphorus-containing acid groups chemically bonded to said metal oxide/hydroxide surface selected from the group consisting of a phosphonic acid group and a phosphinic acid group; an unreacted acid group oriented away from said metal oxide/hydroxide surface and capable of functioning as the active component of the molecule selected from the group consisting of phosphonic acid, phosphinic acid, sulfonic acid, and carboxylic acid; and an —R— group linking said phosphorus-containing acid group and said unreacted acid group, where R contains not greater than 30 carbon atoms and comprises an aliphatic, aromatic, carbocyclic, or heterocyclic moiety.

8. The active material of claim 1 wherein said organic acid molecules comprise phosphorus-containing organic acid groups chemically bonded to said metal oxide/hydroxide surface selected from the group consisting of a phosphonic acid radical having the formula (—R)P(O)(OH)$_2$ and a phosphinic acid group having the formula (—R)(—R')P(O)(OH) where R' may be hydrogen or a 1-30 carbon-containing radical; an unreacted acid group oriented away from said metal oxide/hydroxide surface and capable of functioning as the active component of the molecule selected from the group consisting of phosphonic acid, phosphinic acid, sulfonic acid, and carboxylic acid; and an —R— group linking said phosphorus-containing acid group and said unreacted acid group, where R contains not greater than 30 carbon atoms comprises an aliphatic, aromatic, carbocyclic, or heterocyclic moiety.

9. The active material of claim 1 wherein said organic acid molecules comprise phosphorus-containing acid groups chemically bonded to said metal oxide/hydroxide surface selected from the group consisting of a phosphonic acid group having the formula (—R)P(O)(OH)$_2$ and a phosphinic acid group having the formula (—R)-(—R')P(O)(OH) where R' may be hydrogen or a 1-30 carbon-containing radical; an unreacted acid group oriented away from said metal oxide/hydroxide surface and capable of functioning as the active component of the molecule selected from the group consisting of phosphonic acid, phosphinic acid, sulfonic acid, and carboxylic acid; and an —R— group linking said phosphorus-containing acid group and said unreacted acid group, where R is an organic radical selected from the class of saturated and unsaturated hydrocarbon radicals having the formula —C$_m$H$_n$— where m is an integer not greater than 30 and n is an integer from 2 to 60, an aromatic radical, a carbocyclic radical, and a heterocyclic radical.

10. The active material of claim 1 wherein said organic acid molecules comprise phosphorus-containing acid groups chemically bonded to said metal oxide/hydroxide surface selected from the group consisting of a phosphonic acid group having the formula (—R)P(O)-(OH)$_2$ and a phosphinic acid group having the formula (—R)(—R')P(O)(OH) where R' may be hydrogen or a 1-30 carbon-containing radical; an unreacted acid group oriented away from said metal oxide/hydroxide surface and capable of functioning as the active component of the molecule selected from the group consisting of phosphonic acid, phosphinic acid, sulfonic acid, and carboxylic acid; and an —R— group linking said phosphorus-containing acid group and said unreacted acid group, where R is an organic radical selected from the class of saturated and unsaturated hydrocarbon radicals having the formula —C$_m$H$_n$— where m is an integer not greater than 30 and n is an integer from 2 to 60, an aromatic radical having the formula

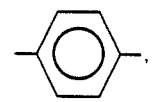

a carbocyclic radical having the formula

and a heterocyclic radical.

11. The active material of claim 1 wherein said metal oxide/hydroxide surface comprises the oxide/hydroxide of any element capable of forming an oxide/hydroxide selected from the group consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), elements in the lanthanide series and the actinide series, mixtures thereof, and mixtures of Groups IIa (Be, Mg, Ca, Sr, Ba, and Ra) and VIb (Se, Te, and Po).

12. The active material of claim 1 wherein said metal oxide/hydroxide surface comprises the oxide/hydroxide of an element selected from the class consisting of aluminum, magnesium, titanium, zirconium, iron, chromium, zinc, vanadium, and combinations thereof.

13. The active material of claim 1 wherein said metal oxide/hydroxide surface comprises the oxide/hydroxide of an element selected from the class consisting of aluminum and zirconium.

14. The active material of claim 1 wherein said active material comprises an adsorbent stable at a pH range of from about 1 to 14 and is insoluble in aqueous media ranges.

15. An active material comprising a metal oxide/hydroxide surface having bonded to reactive sites thereon a substantially monomolecular layer of organic acid molecules; said organic acid molecules comprising an unreacted acid group selected from the group consisting of phosphonic acid, phosphinic acid, sulfonic acid, and carboxylic acid; and a phosphorus-containing acid group chemically bonded to a reactive site on said metal oxide/hydroxide surface and selected from the group consisting of a phosphonic acid group and a phosphinic acid group.

16. The active material of claim 15 wherein said organic acid molecules comprise —R— groups linking said phosphorus-containing acid group and said unreacted acid groups, where R is an organic radical selected from the class of saturated and unsaturated hydrocarbon radicals having the formula —$C_mH_n$— where m is an integer not greater than 30 and n is an integer from 2 to 60, an aromatic radical, a carbocyclic radical, and a heterocyclic radical.

17. An active material capable of functioning as an adsorbent comprising:
  (a) a metal oxide/hydroxide surface which comprises the oxide/hydroxide of any element capable of forming an oxide/hydroxide selected from the group consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), elements in the lanthanide series and the actinide series, mixtures thereof, and mixtures of Groups IIa (Be, Mg, Ca, Sr, Ba, and Ra) and VIb (Se, Te, and Po), and having chemically bonded to reactive sites on the surface thereof;
  (b) a substantially monomolecular layer of organic acid molecules, each organic acid molecule comprising:
    (i) an unreacted acid group selected from the group consisting of phosphonic acid, phosphinic acid, sulfonic acid, and carboxylic acid;
    (ii) a phosphorus-containing acid group bonded to a reactive site on said metal oxide/hydroxide surface and selected from the group consisting of a phosphonic acid group and a phosphinic acid group; and
    (iii) an —R— group linking said phosphorus-containing acid group and said unreacted acid group, where R is an organic radical selected from the class of saturated and unsaturated hydrocarbon radicals having the formula —$C_mH_n$— where m is an integer not greater than 30 and n is an integer from 2 to 60, an aromatic radical, a carbocyclic radical, and a heterocyclic radical.

18. A method of making an active material comprising a metal oxide/hydroxide surface having bonded to reactive sites on the surface thereof a substantially monomolecular layer of organic acid molecules comprising:
  (a) bonding to reactive sites on said metal oxide/hydroxide surface a monomolecular layer of organic acid molecules comprising phosphonic or phosphinic acid groups bonded to said surface and an unreacted acid group selected from the group consisting of phosphonic acid, phosphinic acid, sulfonic acid, and carboxylic acid; and
  (b) removing excess organic acid molecules from said metal oxide/hydroxide surface to leave only a monomolecular layer of said organic acid molecules on said surface.

19. The process of claim 18 wherein said removing step comprises rinsing said active material with a liquid capable of removing organic acid molecules not chemically bonded to reactive sites on said metal oxide/hydroxide surface.

20. The process of claim 19 wherein said removal step comprises rinsing said active material with a base to remove organic acid material not chemically bonded to said metal oxide/hydroxide surface.

* * * * *